US009261727B2

United States Patent
Yang et al.

(10) Patent No.: US 9,261,727 B2
(45) Date of Patent: Feb. 16, 2016

(54) LIQUID CRYSTAL DISPLAY

(71) Applicant: Samsung Display Co., Ltd., Yongin (KR)

(72) Inventors: Seung-Suk Yang, Asan-si (KR); Sangyeoul Lim, Suwon-si (KR); Yongchan Jeon, Ulsan (KR); Young-Min Jung, Asan-si (KR); Kwangjae Kim, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 161 days.

(21) Appl. No.: 13/909,436

(22) Filed: Jun. 4, 2013

(65) Prior Publication Data

US 2014/0211128 A1 Jul. 31, 2014

(30) Foreign Application Priority Data

Jan. 29, 2013 (KR) ........................ 10-2013-0010022

(51) Int. Cl.
*G09G 3/38* (2006.01)
*G02F 1/1335* (2006.01)

(52) U.S. Cl.
CPC .... *G02F 1/133514* (2013.01); *G02F 1/133621* (2013.01); *G02F 2001/133622* (2013.01)

(58) Field of Classification Search
CPC .............. G02F 1/133514; G02F 2001/133622; G02F 1/1335

USPC .......................................................... 345/102
See application file for complete search history.

(56) References Cited

U.S. PATENT DOCUMENTS

| 5,818,554 A | * | 10/1998 | Hiyama et al. ................... 349/67 |
| 2008/0094541 A1 | * | 4/2008 | Ma et al. ........................... 349/69 |
| 2009/0290106 A1 | * | 11/2009 | Song et al. ...................... 349/107 |
| 2010/0264480 A1 | | 10/2010 | Cheng et al. |
| 2012/0218622 A1 | * | 8/2012 | Bae et al. ........................ 359/296 |
| 2012/0287143 A1 | * | 11/2012 | Brown Elliott ............... 345/589 |
| 2013/0083390 A1 | * | 4/2013 | Hwang et al. .................. 359/296 |

* cited by examiner

*Primary Examiner* — Towfiq Elahi

(74) *Attorney, Agent, or Firm* — H.C. Park & Associates, PLC

(57) ABSTRACT

A liquid crystal display includes a liquid crystal display panel including pixels and a backlight unit disposed at a rear side of the liquid crystal display panel to supply first and second color lights having different wavelengths to the liquid crystal display panel. In each pixel, first and second color filters having first and second colors different from each other are sequentially arranged in a first direction. Each pixel also includes a first open portion allowing the first and second color filters to be spaced apart from each other in the first direction and a second open portion allowing the second color filter to be spaced apart from a color filter of an adjacent pixel in the first direction. The backlight unit supplies the first and second color lights to the liquid crystal display panel during first and second sub-fields obtained by dividing a frame.

10 Claims, 9 Drawing Sheets

< 1-Field >

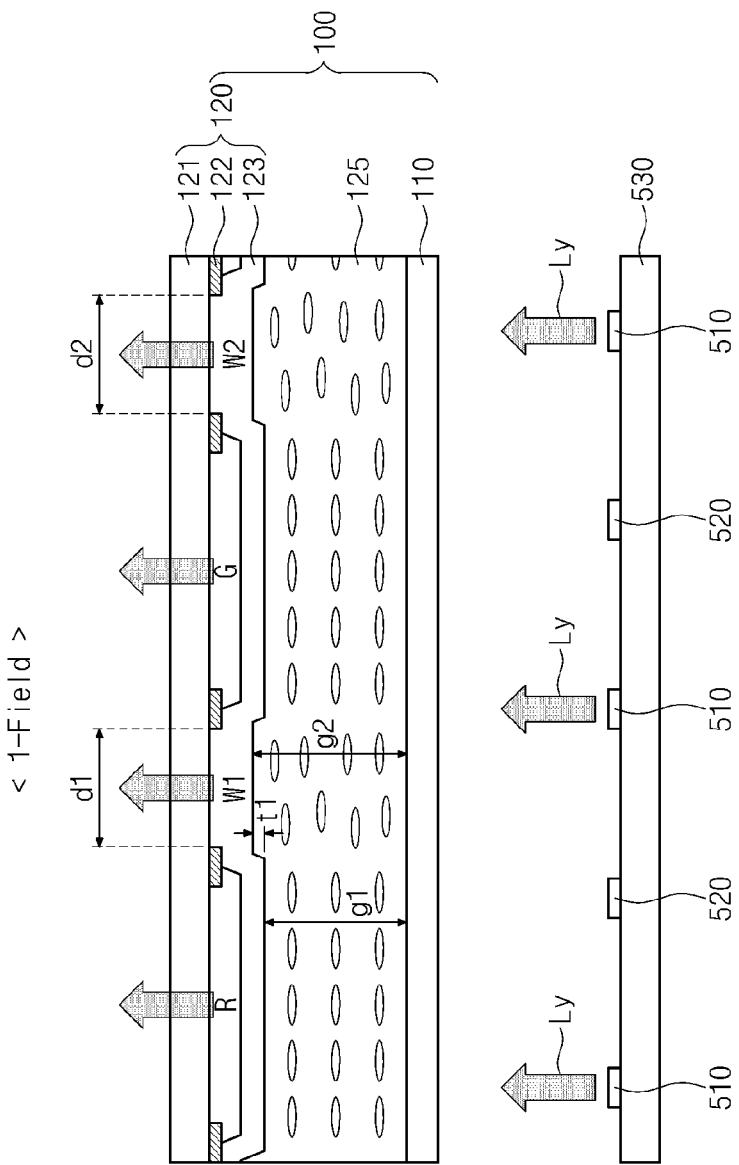

LIQUID CRYSTAL DISPLAY

CROSS REFERENCE TO RELATED APPLICATION

This application claims priority from and the benefit of Korean Patent Application No. 10-2013-0010022, filed on Jan. 29, 2013, which is hereby incorporated by reference for all purposes as if fully set forth herein.

BACKGROUND OF THE INVENTION

1. Field of the Invention

Exemplary embodiments of the invention relate to a liquid crystal display having an improved display quality and response speed.

2. Description of the Background

In general, a liquid crystal display (LCD) realizes a full color image using a space division scheme. For instance, a liquid crystal display panel may include red, green, and blue color filters repeatedly arranged to correspond to sub-pixels in a one-to-one correspondence. A combination of the red, green, and blue color filters may serve as a minimum unit to realize a color, and the full color image is realized by a transmittance difference between the sub-pixels of the liquid crystal display panel and the color combination of the red, green, and blue color filters. An arrangement in which the red, green, and blue color filters are arranged in different spaces is called the space division scheme.

In a time division scheme (or a field sequential scheme), which is able to realize the full color image with high transmittance and low manufacturing cost, the color filters are omitted from the liquid crystal display panel and a backlight unit disposed at a rear side of the liquid crystal display panel may include red, green, and blue light sources respectively to emit red, green, and blue color lights. In addition, a frame is divided into three fields timely separated from each other. The red, green, and blue light sources are lighted in each field, thereby sequentially displaying red, green, and blue color images. Accordingly, an observer perceives the full color image obtained by combining the red, green, and blue color images by a physiological visual sensation.

In the liquid crystal display in which the time division scheme is applied, a color breakup phenomenon, in which the red, green and blue color images are separately perceived, may momentarily occur when a viewpoint is changed due to a blinking of eyes or a movement of the observer regardless of the high transmittance and the low manufacturing cost.

The above information disclosed in this Background section is only for enhancement of understanding of the background of the invention, and therefore may contain information that does not form the prior art that is already known to a person of ordinary skill in the art.

SUMMARY OF THE INVENTION

Exemplary embodiments of the invention provide a liquid crystal display having an improved display quality and response speed.

Additional features of the invention will be set forth in the description which follows, and in part will be apparent from the description, or may be learned by practice of the invention.

Exemplary embodiments of the invention disclose a liquid crystal display including a liquid crystal display panel and a backlight unit. The liquid crystal display panel includes a plurality of pixels. Each of the plurality of pixels includes a first color filter, a second color filter, a first open portion, and a second open portion. The first color filter corresponds to a first color. The second color filter corresponds to a second color different from the first color. The first color filter and the second color filter are sequentially arranged in a first direction. The first open portion is disposed between the first color filter and the second color filter. The second open portion is disposed between the second color filter and a first color filter of an adjacent pixel in the first direction. The backlight unit is configured to provide, to the liquid crystal display, a first light and a second light having a different wavelength than the first light. The liquid crystal display panel is configured to display an image in a frame. The backlight unit is configured to provide, to the liquid crystal display panel, the first light during a first sub-field of the frame and the second light during a second sub-field of the frame.

Exemplary embodiments of the invention also disclose a liquid crystal display including a liquid crystal display panel and a backlight unit. The liquid crystal display panel includes a plurality of pixels. Each of the plurality of pixels includes a first color filter, a second color filter, and at least two open portions. The first color filter corresponds to a first color. The second color filter corresponds to a second color different from the first color. The first color filter and the second color filter are sequentially arranged in a first direction. The at least two open portions are spaced apart from each other and are disposed in the first direction. Each of the at least two open portions have a width equal to or smaller than 100 micrometers in the first direction. The backlight unit is configured to provide, to the liquid crystal display, a first light and a second light having a different wavelength than the first light. The liquid crystal display panel is configured to display an image in a frame. The backlight unit is configured to provide, to the liquid crystal display panel, the first light during a first sub-field of the frame and the second light during a second sub-field of the frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 4 is a cross-sectional view taken along a line I-I' of FIG. 3A according to exemplary embodiments of the invention.

DETAILED DESCRIPTION OF THE ILLUSTRATED EMBODIMENTS

Figure 1:
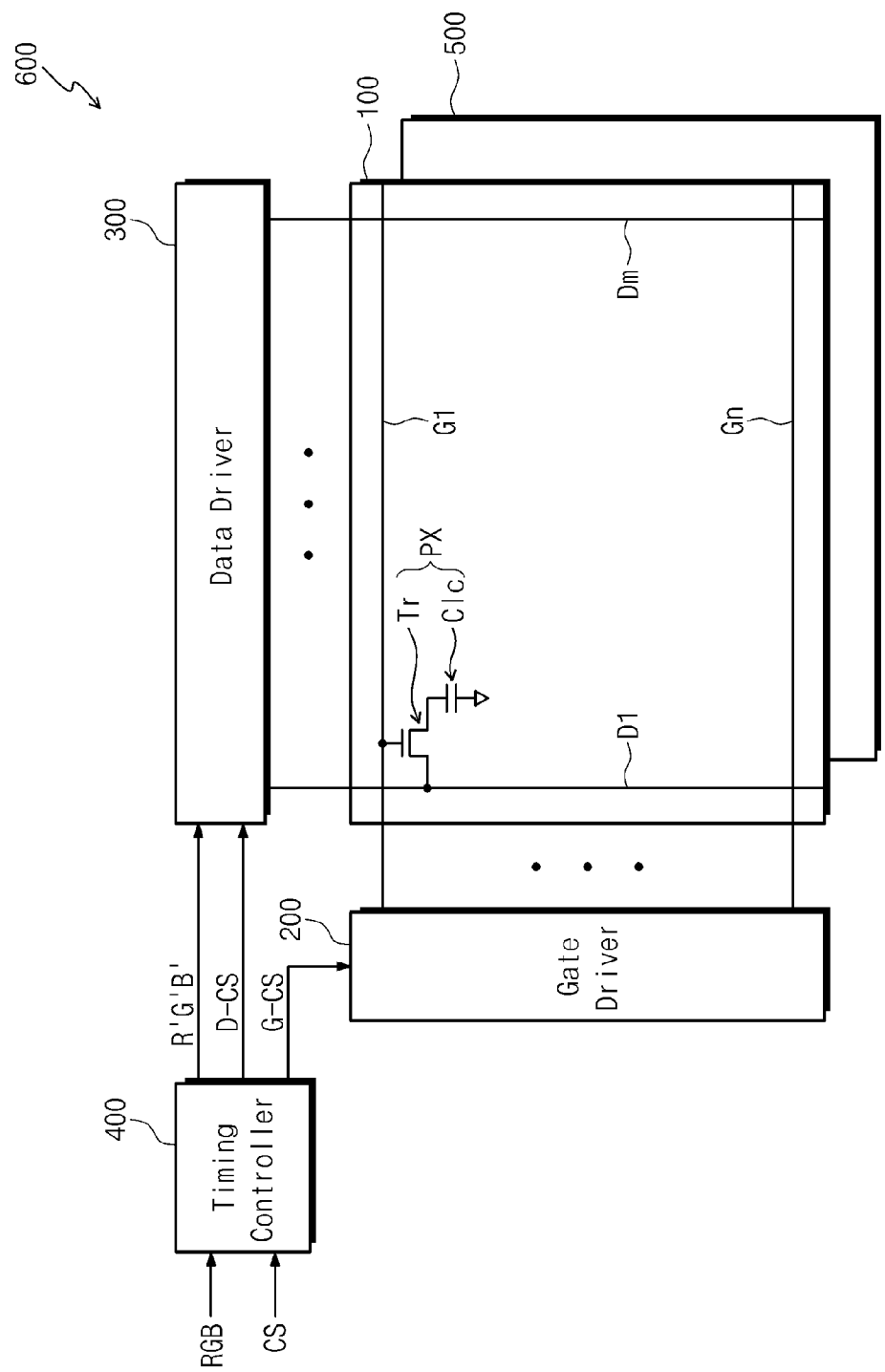
FIG. 1 is a block diagram showing a liquid crystal display according to exemplary embodiments of the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items. It may also be understood that for the purposes of this disclosure, "at least one of X, Y, and Z" can be construed as X only, Y only, Z only, or any combination of two or more items X, Y, and Z (e.g., XYZ, XYY, YZ, ZZ).

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be explained in detail with reference to the accompanying drawings.

FIG. 1 is a block diagram showing a liquid crystal display according to exemplary embodiments of the present disclosure.

Referring to FIG. 1, a liquid crystal display (LCD) 600 may include a LCD panel 100, a gate driver 200, a data driver 300, a timing controller 400, and a backlight unit 500. The LCD panel 100 may display an image. The gate driver 200 and the data driver 300 may drive the LCD panel 100, and the timing controller 400 may control a drive of the gate driver 200 and the data driver 300.

The LCD panel 100 may include a plurality of gate lines G1 to Gn, a plurality of data lines D1 to Dm, and a plurality of pixels PX (where n and m are whole numbers larger than zero). The gate lines G1 to Gn extend in a row direction and are arranged in a column direction to be substantially parallel to each other. The data lines D1 to Dm extend in the column direction and are arranged in the row direction to be substantially parallel to each other.

Each pixel PX may include a thin film transistor (TFT) and a liquid crystal capacitor. For instance, the pixel connected to a first gate line G1 and a first data line D1 may include a TFT Tr and a liquid crystal capacitor Clc.

The TFT Tr includes a gate electrode connected to the first gate line G1, a source electrode connected to the first data line D1, and a drain electrode connected to the liquid crystal capacitor Clc.

The timing controller 400 may receive image signals RGB and control signals CS, and may convert a data format of the image signal RGB appropriate to an interface between the data driver 300 and the timing controller 400. The timing controller 400 may apply the converted image signals R'G'B' to the data driver 300. In addition, the timing controller 400 may generate a data control signal D-CS (e.g., an output start signal, a horizontal start signal, etc.) and a gate control signal G-CS (e.g., a vertical start signal, a vertical clock signal, a vertical clock bar signal, etc.) based on the received control signals CS. The data control signal D-CS may be applied to the data driver 300 and the gate control signal G-CS may be applied to the gate driver 200.

The gate driver 200 may sequentially output gate signals in response to receiving the gate control signal G-CS from the timing controller 400. Accordingly, the pixels PX may be sequentially scanned by rows by the gate signals.

The data driver 300 may convert the image signals R'G'B' to data voltages in response to receiving the data control signal D-CS from the timing controller 400. The data voltages are applied to the LCD panel 100.

Thus, each pixel PX is turned on by the gate signal, and the turned-on pixel PX may display an image having a desired gray scale using a corresponding data voltage of the data voltages provided from the data driver 300.

As shown in FIG. 1, the LCD 600 further includes a backlight unit 500 disposed at a rear side of the LCD panel 100. The backlight unit 500 may provide the light to the LCD panel 100 at the rear side of the LCD panel 100.

As an example, the backlight unit 500 may include a plurality of light emitting diodes (not shown) as its light source. The light emitting diodes may be disposed on a printed circuit board (not shown) in a stripe form or a matrix form.

Figure 2:
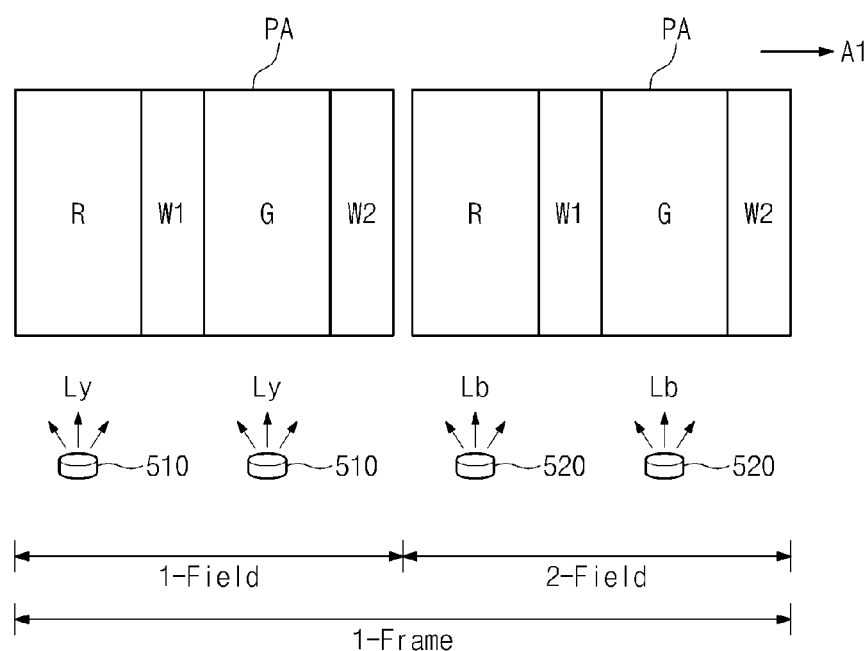
FIG. 2 is a view showing a principle of realizing a full color image using time and space division schemes according to exemplary embodiments of the invention.

FIG. 2 is a view showing a principle of realizing a full color image using time and space division schemes.

Referring to FIG. 2, the LCD panel 100 to which the time and space division schemes are applied may include first and second color filters having different colors from each other. As an example, the first color filter may be a red color filter R to produce a red color, and the second color filter may be a green color filter G to produce a green color. An area corresponding to one pixel may be referred to as a pixel area PA. Each pixel area PA may include the red and green color filters R and G. In addition, each pixel area PA may include first and second open portions W1 and W2. The first open portion W1 may be disposed between the red and green color filters R and G, and the second open portion W2 may be disposed adjacent to a side of the red color filter R or the green color filter G.

The backlight unit 500 may include a first light source 510 emitting a first color light Ly and a second light source 520 emitting a second color light Lb. A frame 1-Frame may be divided into two sub-fields, e.g., a first sub-field 1-Field and a second sub-field 2-Field, according to a time sequence. In the first sub-field 1-Field, the first light source 510 may be driven, and the first color light Ly may be provided by the backlight unit 500 to the LCD panel 100. In the second sub-field 2-Field, the second light source 520 may be driven, and the second color light Lb may be provided by the backlight unit 500 to the LCD panel 100.

In some cases, the first color light Ly may be a yellow color light and the second color light Lb may be a blue color light. When the first color light Ly is a yellow color light, the first color light Ly includes a red light component and a green light component.

The red light component of the first color light Ly generated from the backlight unit 500 during the first sub-field 1-Field may pass through the first color filter R and may be displayed as a red image. The green light component of the first color light Ly may pass through the second color filter G and may be displayed as a green image.

Then, the second color light Lb generated from the backlight unit 500 during the second sub-field 2-Field may pass through the first and second open portions W1 and W2 and may be displayed as a blue image.

As described above, the first and second open portions W1 and W2 may provide a space in which the blue image is displayed during the second sub-fields 2-Field. In addition, the first and second open portions W1 and W2 prevent the color breakup phenomenon from occurring and enhance brightness. The size of the first and second open portions W1 and W2 is determined according to a transmittance appropriate for a desired brightness or color of the frame.

Figure 3A:
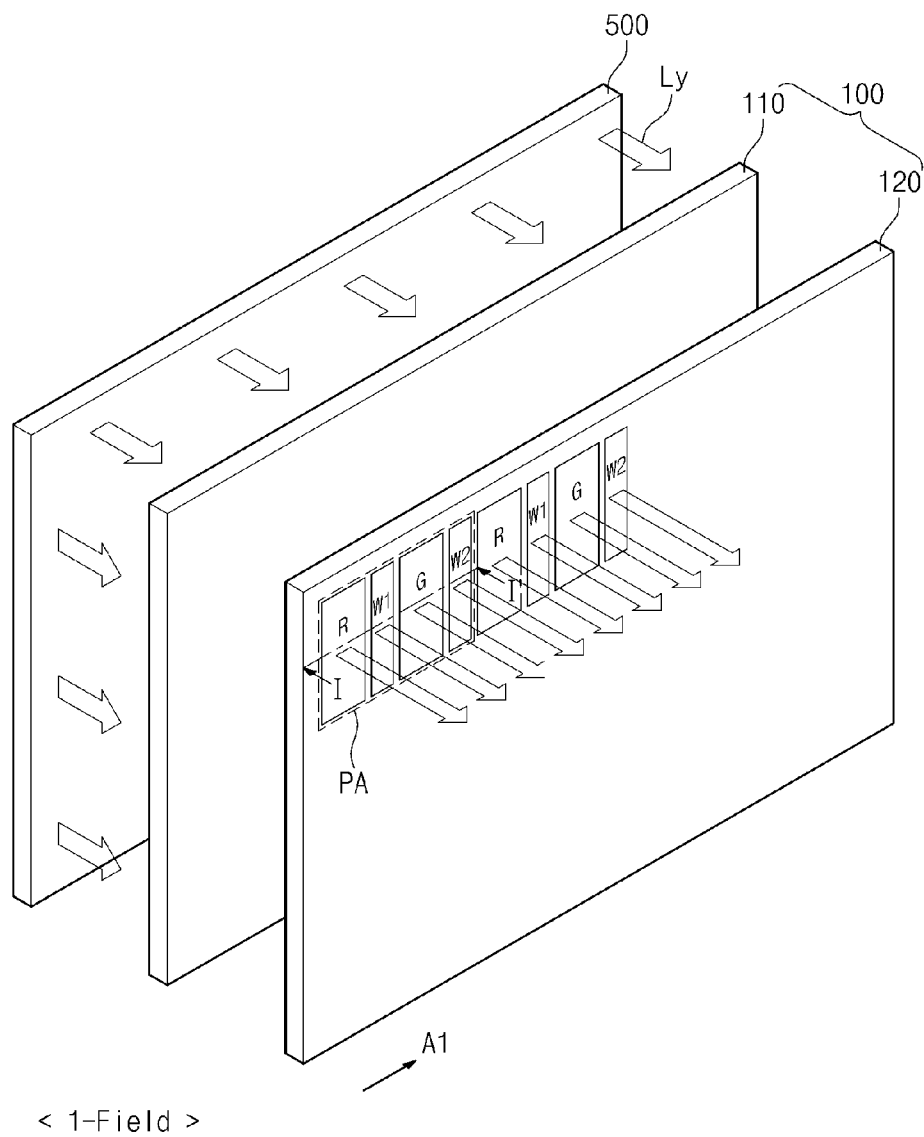
FIGS. 3A and 3B are views showing a principle of realizing a full color image using time and space division schemes according to exemplary embodiments of the invention.
Figure 3B:
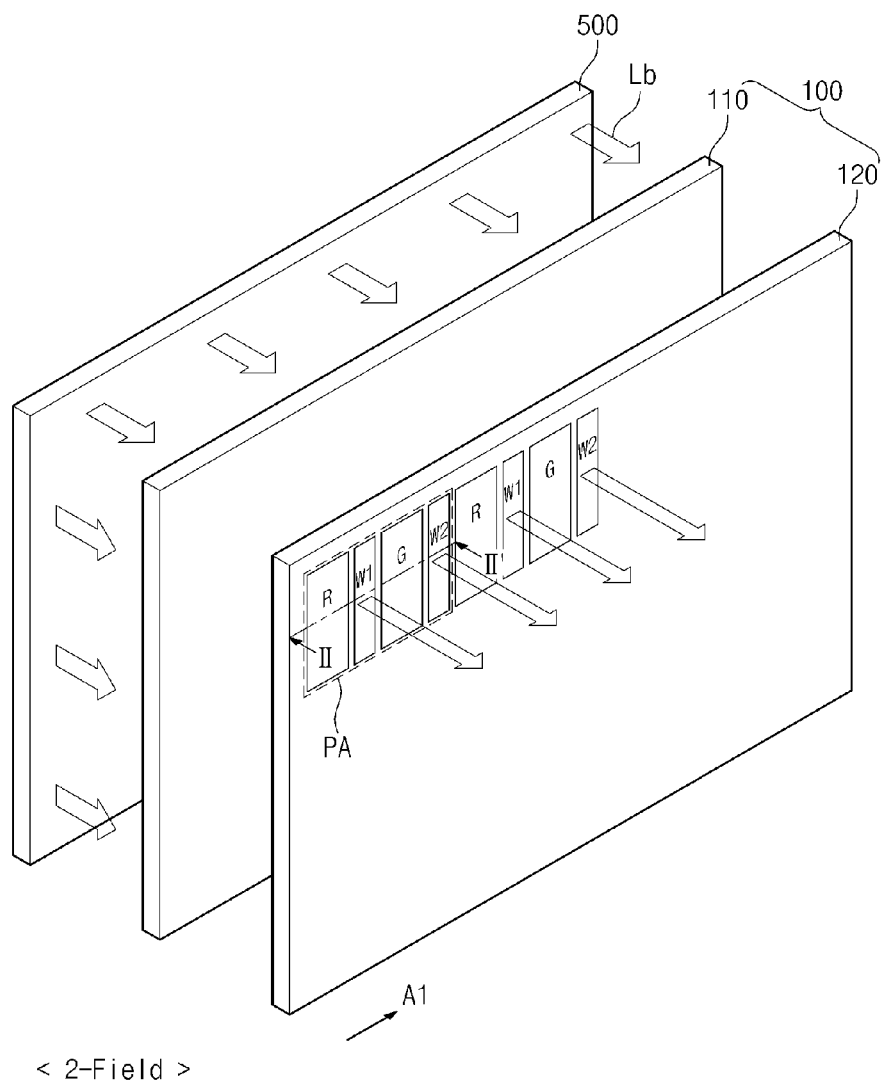
Figure 5:
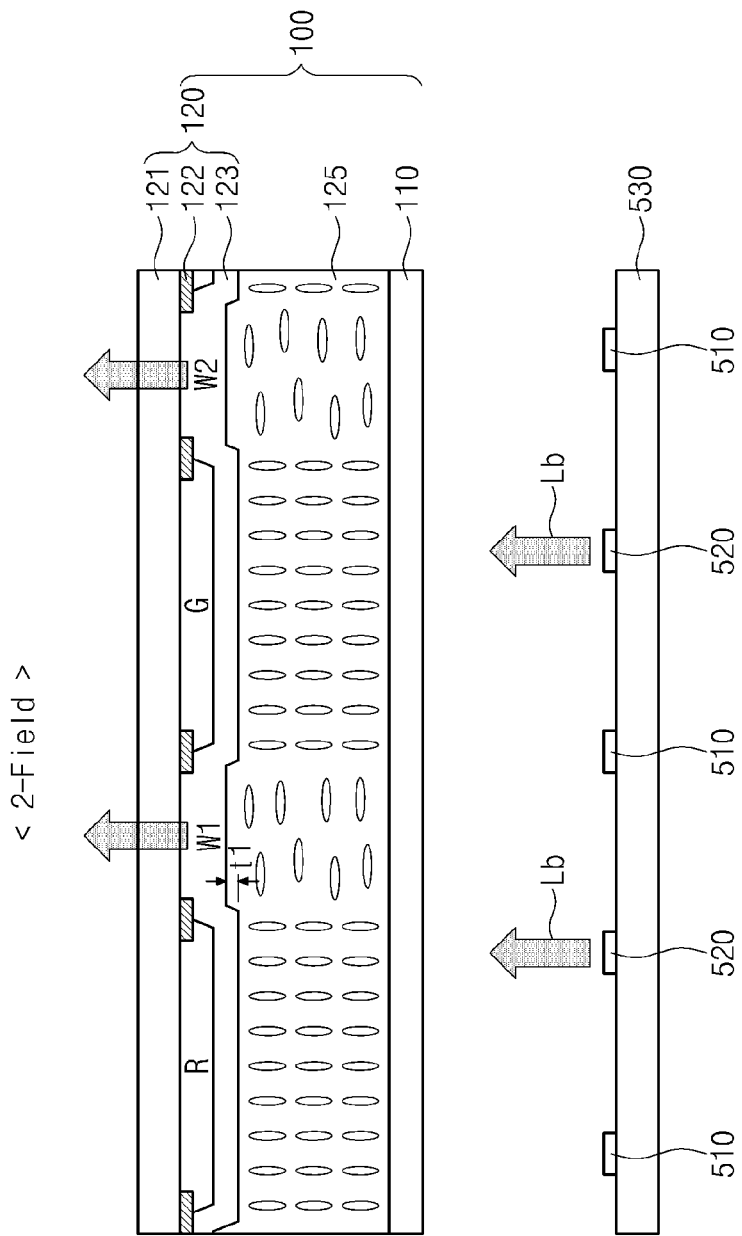
FIG. 5 is a cross-sectional view taken along a line II-II' of FIG. 3B according to exemplary embodiments of the invention.

FIGS. 3A and 3B are views showing a principle of realizing a full color image using time and space division schemes. FIG. 4 is a cross-sectional view taken along a line I-I' of FIG. 3A. FIG. 5 is a cross-sectional view taken along a line II-II' of FIG. 3B. FIGS. 3A and 4 show an operation mode of the first sub-field of the frame. FIGS. 3B and 5 show an operation mode of the second sub-field of the frame.

According to exemplary embodiments of the invention, an operation mode of the LCD panel 100 and the backlight unit 500 may be changed every first and second sub-fields 1-Field and 2-Field, but a structure of the LCD panel 100 and the backlight unit 500 is not changed. Accordingly, the structure of the LCD panel 100 and the backlight unit 500 will be described.

Referring to FIGS. 3A and 4, the LCD panel 100 may include the red and green color filters R and G repeatedly arranged in a first direction A1. The first direction A1 may be parallel to a direction in which gate line G1 to Gn rows in the LCD panel 100 extend.

The LCD panel 100 includes a first substrate 110, a second substrate 120 substantially parallel to the first substrate 110, and a liquid crystal layer 125 interposed between the first substrate 110 and the second substrate 120.

The first substrate 110 may be a lower substrate on which the TFT Tr and a first electrode (i.e., a pixel electrode) of the liquid crystal capacitor Clc of each pixel PX are disposed. The second substrate 120 may be an upper substrate on which the two color filters R and G disposed in each pixel area PA corresponding to each pixel PX and a second electrode (i.e., a reference electrode) of the liquid crystal capacitor Clc are disposed.

For the convenience of explanation, the pixel electrode disposed on the first substrate 110 and the reference electrode disposed on the second substrate 120 are not shown.

Referring to FIG. 4, the second substrate 120 may include a base substrate 121, the red and green color filters R and G disposed on the base substrate 121, a black matrix 122 disposed along edges of the red and green color filters R and G, and an overcoating layer 123 covering the red and green color filters R and G and the black matrix 122.

The red and green color filters R and G may be arranged in the first direction A1 and may be spaced apart from each other by the first open portion W1 with a predetermined distance. Thus, the red and green color filters R and G do not overlap. The green color filter G is spaced apart from a red color filter (not shown) of another pixel, which is adjacent to the green color filter G in the first direction A1, by the second open portion W2 in the first direction A1. Since the color filters are spaced apart from each other by the first and second open portions W1 and W2, portions, in which the color filters are overlapped with each other, are removed to prevent the arrangement of liquid crystal from being dispersed in the overlapped portions.

The overcoating layer 123 may be formed of an organic insulating layer and covers the red and green color filters R and G and the first and second open portions W1 and W2. A step difference t1 between the area in which the color filters are disposed and the area in which the first and second open portions W1 and W2 are disposed may exist. As the size of the first and second open portions W1 and W2 and a width in the first direction A1 of the first and second open portions W1 and W2 are reduced, the step difference t1 may also reduce.

When the step difference t1 is reduced, a cell gap difference of the liquid crystal display panel 100 may be reduced. For instance, due to the step difference t1, the LCD panel 100 may have a first cell gap g1 in the area in which the color filters are formed and a second cell gap g2 in the area in which the first and second open portions W1 and W2 are formed. The first cell gap g1 may be smaller than the second cell gap g2. However, since an intensity of an electric field formed between the pixel electrode and the reference electrode is relatively small in the area in which the cell gap is relatively large, a response speed of the liquid crystal is slow. Therefore, it is important to reduce the cell gap difference in the LCD panel 100.

A width in the first direction A1 of the first open portion W1 and a width in the first direction A1 of the second open portion W2 may be referred to as a first width d1 and a second width d2, respectively. In some cases, the first and second widths d1 and d2 may be equal, and in some cases, the first and second widths d1 and d2 may be different. In some cases, each of the first and second width d1 and d2 may be greater than 0 micrometers and equal to or smaller than about 100 micrometers.

When the width of the first and second open portions W1 and W2 is reduced, the step difference t1 may be reduced to be equal to or greater than 0 micrometers and smaller than or equal to about 0.7 micrometers, and thus the response speed of the LCD 600 may be improved.

The backlight unit 500 may include the first light source 510, the second light source 520, and the printed circuit board 530 on which the first and second light sources 510 and 520 are mounted. The first light source 510 and the second light source 520 may be alternately arranged with each other on the printed circuit board 530, but are not limited thereto or thereby.

The first light source 510 may emit the first color light Ly and the second light source 520 may emit the second color light Lb. During the first sub-field 1-Field, the first light source 510 may emit the first color light Ly, and the second light source 520 is turned off.

Although not shown in figures, each pixel may include a red sub-pixel corresponding to the red color filter R, a green sub-pixel corresponding to the green color filter G, a first white sub-pixel corresponding to the first open portion W1, and a second white sub-pixel corresponding to the second open portion W2. Each of the red, green, first white, and second white sub-pixels may include transistor TFT and a liquid crystal capacitor to be independently operated.

The red, green, first white, and second white sub-pixels may operate in the first sub-field 1-Field. Thus, the first color light Ly emitted from the first light source 510 may pass through the red and green color filters R and G and the first and second open portions W1 and W2 to display an image.

Referring to FIGS. 3B and 5, during the second sub-field 2-Field, the second light source 520 may emit the second color light Lb, and the first light source 510 is turned off.

The red and green sub-pixels are not operated in the second sub-field 2-Field, but the first and second white sub-pixels are operated in the second sub-field 2-Field. Accordingly, the second color light Lb emitted from the second light source 520 does not pass through the red and green color filters R and G but passes through the first and second open portions W1 and W2, thereby displaying a blue image. When the second color light Lb is emitted from the second light source 520, liquid crystal molecules in a first region of the liquid crystal layer corresponding to the red and green color filters R and G are oriented in a direction perpendicular to the first substrate 110 and the second substrate 120, and liquid crystal molecules in a second region of the liquid crystal layer corresponding to open portions W1 and W2 are oriented in a direction substantially parallel to the first substrate 110 and the second substrate 120. This driving state may be achieved, for example, by applying a data voltage that corresponds to a black color to the TFTs Tr (see FIG. 1) in the R and G sub-pixels.

Figure 6:
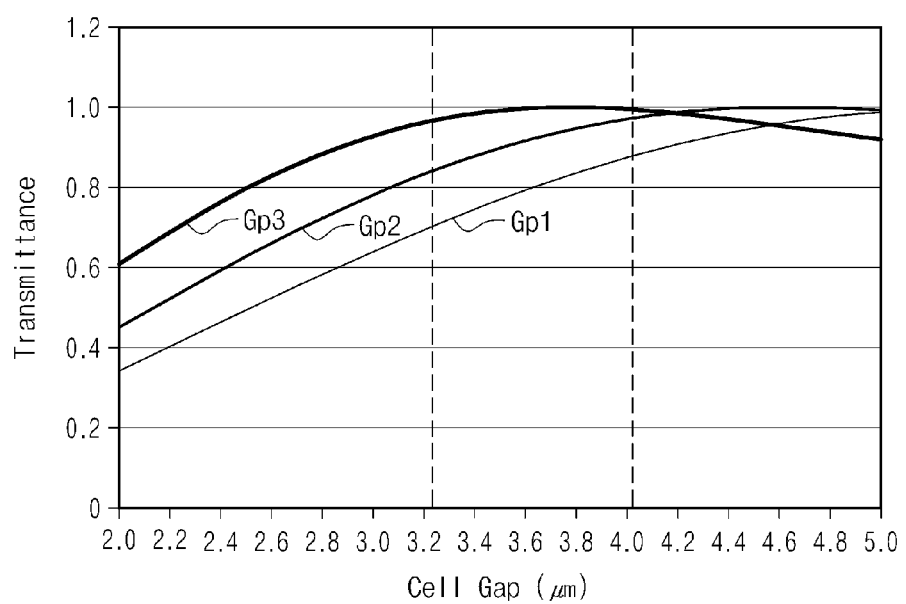
FIG. 6 is a graph showing a transmittance as a function of a cell gap of red, green, and blue light components according to exemplary embodiments of the invention.

FIG. 6 is a graph showing a transmittance as a function of a cell gap of red, green, and blue light components. In FIG. 6, an x-axis represents the cell gap and a y-axis represents the transmittance. A first graph Gp1 represents a variation of the transmittance of the red light component; a second graph Gp2 represents a variation of the transmittance of the green light component; and a third graph Gp3 represents a variation of the transmittance of the blue light component.

Referring to FIG. 6, the brightness of the red and green light components may linearly increase as the cell gap increases until the cell gap reaches approximately 4.0 micrometers (μm). The brightness of the blue light component may linearly increase until the cell gap reaches approximately 3.2 micrometers. When the cell gap exceeds 3.2 micrometers, the increase in brightness of the blue light component is relatively small.

Consequently, when the cell gap increases, the increasing rate in the brightness of the red and green light components is relatively high, but the increasing rate in the brightness of the blue light component is relatively small. Therefore, when the cell gap is increased in the first and second open portions W1 and W2, transmittance through the red and green light components may increase, so that an image having a yellowish color occurs (referred to as yellow phenomenon).

However, when the first and second widths d1 and d2 of the first and second open portions W1 and W2 are reduced to smaller than or equal to about 100 micrometers, the cell gap may be prevented from increasing in the first and second open portions W1 and W2 thereby preventing occurrence of the yellowish phenomenon.

Figure 7:
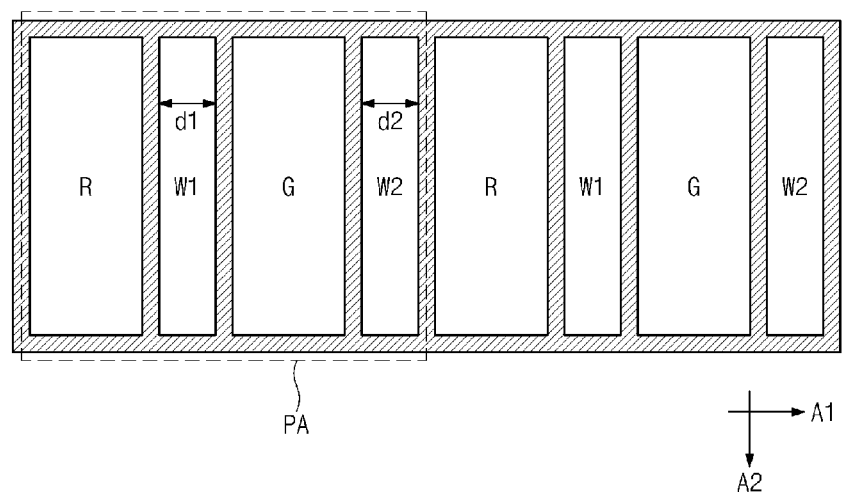
FIG. 7 is a plan view showing a second substrate shown in FIG. 3A according to exemplary embodiments of the invention.

FIG. 7 is a plan view illustrating the second substrate 120 shown in FIG. 3A.

Referring to FIG. 7, the red and green color filters R and G may be arranged in the first direction A1 in each pixel area PA. Each of the red and green color filters R and G may have a rectangular shape in which a length in the second direction A2 (substantially perpendicular to the first direction A1) may be longer than a length in the first direction A1.

The red and green color filters R and G may be arranged in the first direction A1 and may be spaced apart from each other by the first open portion W1 with a predetermined distance. Thus, the red and green color filters R and G do not overlap. In addition, the green color filter G is spaced apart from the red color filter R of another pixel, which is adjacent to the green color filter G in the first direction A1, by the second open portion W2 in the first direction A1.

The first open portion W1 and the second open portion W2 may have the first width d1 and the second width d2 in the first direction A1, respectively. In some cases, the first and second width d1 and d2 may be equal, and, in some cases, the first and second width d1 and d2 may be different from each other. In addition, the first and second white sub-pixels respectively corresponding to the first and second open portions W1 and W2 may be applied with the same voltage or different voltages.

Figure 8:
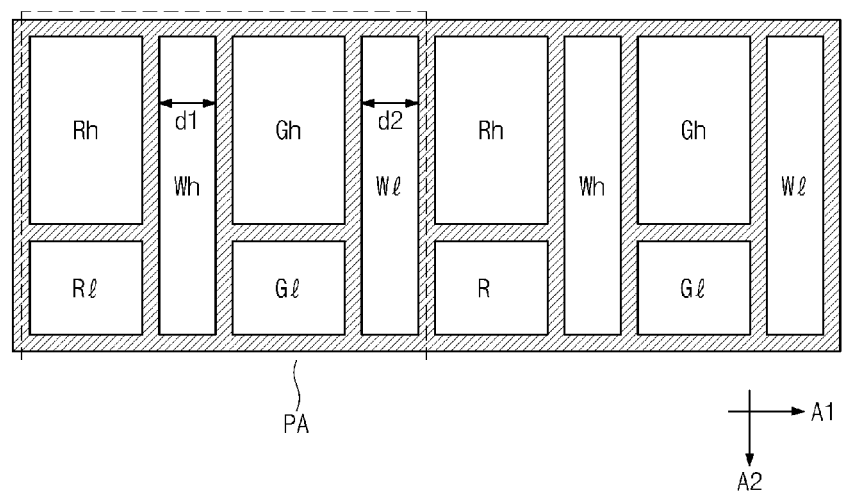
FIG. 8 is a plan view showing a second substrate according to exemplary embodiments of the invention.
Figure 9:
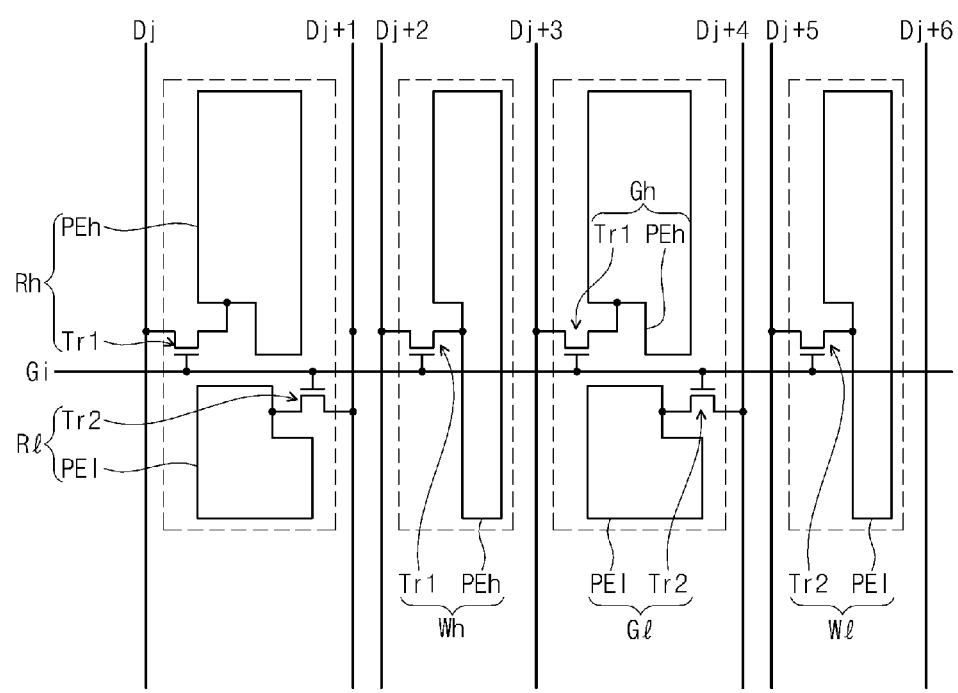
FIG. 9 is an equivalent circuit diagram showing red, green and white sub-pixels of FIG. 8

FIG. 8 is a plan view showing the second substrate 120 according to exemplary embodiments of the invention, and FIG. 9 is an equivalent circuit diagram showing red, green and white sub-pixel of FIG. 8.

Referring to FIG. 8, each pixel may include a red sub-pixel corresponding to the red color filter R, a green sub-pixel corresponding to the green color filter G, and a white sub-pixel corresponding to the first and second open portions W1 and W2.

Each of the red, green, and white sub-pixels may include a high pixel and a low pixel. As shown in FIG. 9, the red sub-pixel includes a red high pixel Rh and a red low pixel R1, the green sub-pixel includes a green high pixel Gh and a green low pixel G1, and the white sub-pixel includes a white high pixel Wh and a white low pixel W1. Each of the red, green, and white high pixels includes a first TFT Tr1 and a high pixel electrode PEh, and each of the red, green, and white low pixels includes a second TFT Tr2 and a low pixel electrode PEA. The first and second TFT Tr1 and Tr2 are commonly connected to a gate line Gi and are electrically connected to two data lines different from each other, respectively. The red, green, and white high pixels Rh, Gh, and Wh may be applied with a data voltage higher than a voltage corresponding to an input gray scale. The red, green, and white low pixels R1, G1, and W1 may be applied with a data voltage lower than the voltage corresponding to the input gray scale. When each sub-pixel is configured to include the high pixel and the low pixel, a visibility of the image may be improved. However, structures of the high pixel and the low pixel are not limited thereto or thereby.

As an example, the red high pixel Rh and the red low pixel R1 may be arranged in the second direction A2 substantially perpendicular to the first direction A1, and the green high pixel Gh and the green low pixel G1 may be arranged in the second direction A2.

The red high pixel Rh and the red low pixel R1 may have the same size or different sizes. In some cases, the size of the red high pixel Rh may be greater than the size of the red low pixel R1. The green high pixel Gh and the green low pixel G1 may have the same size or different sizes. In some cases, the size of the green high pixel Gh may be greater than the size of the green low pixel G1.

A white high pixel Wh may be disposed to correspond to the first open portion W1, and a white low pixel W1 may be disposed to correspond to the second open portion W2. The white high pixel Wh may have a size equal to or different from that of the white low pixel W1. The size of the white high pixel Wh and the white low pixel W1 may be controlled by adjusting a width thereof in the first direction A1. In some cases, the width in the first direction A1 of the white high pixel Wh may be greater than the width in the first direction A1 of the white low pixel W1. The first and second widths d1 and d2 of the first and second open portions W1 and W2 are controlled to correspond to the widths of the white high pixel Wh and the white low pixel W1.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a liquid crystal display panel comprising a plurality of pixels, each of the plurality of pixels comprising:
   a first color filter comprising a first color;
   a first sub-pixel corresponding to the first color filter;
   a second color filter comprising a second color different from the first color, the first color filter and the second color filter being sequentially arranged in a first direction;
   a second sub-pixel corresponding to the second color filter;
   a first open portion disposed between the first color filter and the second color filter;
   a first white sub-pixel corresponding to the first open portion;
   a second open portion disposed between the second color filter and a color filter of an adjacent pixel; and
   a second white sub-pixel corresponding to the second open portion; and a backlight unit configured to provide, to the liquid crystal display panel, a first light and a second light having a different wavelength than the first light,
   wherein:
   the liquid crystal display panel is configured to display an image in a frame;
   the backlight unit is configured to provide, to the liquid crystal display panel, the first light during a first sub-field of the frame and the second light during a second sub-field of the frame; and
   at least one of the first open portion and the second open portion is configured to pass light received from the backlight unit to facilitate display of the image;
   the first sub-pixel, the second sub-pixel, the first white sub-pixel, and the second white sub-pixel are configured to be turned on during the first sub-field of the frame;
   the first sub-pixel and the second sub-pixel are configured to be turned off during the second sub-field of the frame; and
   the first white sub-pixel and the second white sub-pixel are configured to be turned on during the second sub-field of the frame.

2. The liquid crystal display of claim 1, wherein:
   the first white sub-pixel and the second white sub-pixel correspond to portions of a third sub-pixel; and
   the first sub-pixel, the second sub-pixel, and the third sub-pixel are configured to operate independently.

3. The liquid crystal display of claim 2, wherein:
   each of the first sub-pixel, the second sub-pixel, and the third sub-pixel comprises a high pixel and a low pixel;
   the first white sub-pixel corresponds to the high pixel of the third sub-pixel; and
   the second white sub-pixel corresponds to the low pixel of the third sub-pixel.

4. The liquid crystal display of claim 2, wherein:
   the first color filter comprises a red color filter configured to provide a red color; and
   the second color filter comprises a green color filter configured to provide a green color.

5. The liquid crystal display of claim 4, wherein the first light comprises a yellow light and the second light comprises a blue light.

6. The liquid crystal display of claim 5, wherein:
   the first sub-pixel, the second sub-pixel, and third sub-pixel are configured to receive the yellow light to display an image during the first sub-field; and
   the third sub-pixel is configured to receive the blue light to display a blue image during the second sub-field.

7. The liquid crystal display of claim 1, wherein each of the first open portion and the second open portion has a width greater than 0 micrometers and equal to or smaller than 100 micrometers in the first direction.

8. The liquid crystal display of claim 1, wherein the liquid crystal display panel further comprises an overcoating layer disposed on the first color filter, the second color filter, the first open portion, and the second open portion.

9. The liquid crystal display of claim 8, wherein a step difference between the first color filter and the first open portion and between the second color filter and the second open portion is equal to or greater than 0 micrometers and equal to or smaller than 0.7 micrometers.

10. A liquid crystal display, comprising:
    a liquid crystal display panel comprising a plurality of pixels, each of the plurality of pixels comprising:
    a first color filter comprising a first color;
    a first sub-pixel corresponding to the first color filter;

a second color filter comprising a second color different from the first color, the first color filter and the second color filter being sequentially arranged in a first direction;

a second sub-pixel corresponding to the second color filter;

at least two open portions spaced apart from each other and being disposed in the first direction, each of the at least two open portions having a width greater than 0 micrometers and equal to or smaller than 100 micrometers in the first direction; and at least two white sub-pixels respectively corresponding to the at least two open portions; and a backlight unit configured to provide, to the liquid crystal display panel, a first light and a second light having a different wavelength than the first light, wherein:

the liquid crystal display panel is configured to display an image in a frame;

the backlight unit is configured to provide, to the liquid crystal display panel, the first light during a first sub-field of the frame and the second light during a second sub-field of the frame;

at least one of the at least two open portions is configured to pass light received from the backlight unit to facilitate display of the image;

the first sub-pixel, the second sub-pixel, and the at least two white sub-pixels are configured to be turned on during the first sub-field of the frame;

the first sub-pixel and the second sub-pixel are configured to be turned off during the second sub-field of the frame; and the at least two white sub-pixels are configured to be turned on during the second sub-field of the frame.

* * * * *